United States Patent
Lee

(10) Patent No.: US 8,554,923 B2
(45) Date of Patent: *Oct. 8, 2013

(54) METHOD OF PROCESSING DATA IN INTERNET PROTOCOL TELEVISION RECEIVER AND INTERNET PROTOCOL TELEVISION RECEIVER

(75) Inventor: Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 954 days.

This patent is subject to a terminal disclaimer.

(21) Appl. No.: 12/382,236

(22) Filed: Mar. 11, 2009

(65) Prior Publication Data

US 2009/0241154 A1 Sep. 24, 2009

Related U.S. Application Data

(60) Provisional application No. 61/038,423, filed on Mar. 21, 2008, provisional application No. 61/042,255, filed on Apr. 3, 2008.

(30) Foreign Application Priority Data

Jan. 15, 2009 (KR) ........................ 10-2009-0003305

(51) Int. Cl.
*G06F 15/16* (2006.01)
(52) U.S. Cl.
USPC ................ 709/227; 709/206; 725/25; 725/32
(58) Field of Classification Search
USPC ....................................... 709/227; 725/25, 32
See application file for complete search history.

(56) References Cited

U.S. PATENT DOCUMENTS

| | | | |
|---|---|---|---|
| 7,945,936 B2 * | 5/2011 | Yamagishi et al. | 725/97 |
| 2004/0184432 A1 * | 9/2004 | Gateva et al. | 370/349 |
| 2009/0077181 A1 * | 3/2009 | Chen | 709/206 |
| 2009/0193456 A1 * | 7/2009 | Ahn et al. | 725/32 |

FOREIGN PATENT DOCUMENTS

| | | |
|---|---|---|
| AU | 2009201131 | 10/2009 |
| CN | 101026615 A | 8/2007 |
| EP | 1 988 666 | 11/2008 |
| EP | 2 031 828 | 3/2009 |
| EP | 2 104 298 | 9/2009 |
| WO | WO 2007/093126 | 8/2007 |

OTHER PUBLICATIONS

"Broadcast and On-line Services: Search, select and rightful use of content on personal storage systems (TV-anytime); Part 4: Phase 1—Content referencing; ETSI TS 102 822-4", vol. BC, No. V1.3.1, Nov. 1, 2007, XP014040520.

(Continued)

*Primary Examiner* — Yves Dalencourt
(74) *Attorney, Agent, or Firm* — McKenna Long & Aldridge LLP

(57) ABSTRACT

A method of processing data in an IPTV receiver and such an IPTV receiver are disclosed. The method includes receiving location information necessary to acquire a content corresponding to a content reference identifier (CRID) by using the CRID, requesting an Internet protocol multimedia subsystem Gateway (IG) to transmit a session description protocol (SDP) file of the content, wherein the content is identified by the CRID and an instance metadata identifier (IMI), receiving the requested SDP file from the IG, and controlling a session setup for processing the content by using the received location information and the received SDP file.

7 Claims, 7 Drawing Sheets

(56) References Cited

OTHER PUBLICATIONS

Open IPTV Forum: "Open IPTV Forum Functional Architecture V 1.1", Jan. 15, 2008, XP007906507.

Mikoczy et al.: "IMS based IPTV services—Architecture and Implementation", Mobimedia—Proceedings of the $3^{rd}$ International Conference on Mobile Multimedia Communications, Aug. 1, 2007, pp. 1-7, XP007908230.

* cited by examiner

FIG. 3

```xml
<?xml version="1.0" encoding="UTF-8"?>
<schema targetNamespace="urn:tva:ContentReferencing:2005"
xmlns:metadata="urn:tva:metadata:2005" xmlns="http://www.w3.org/2001/XMLSchema"
xmlns:CR="urn:tva:ContentReferencing:2005">
  <element name="ContentReferencingTable" type="CR:ContentReferencingTableType">
    <annotation>
      <documentation>A document conforming to the TV Anytime content referencing specification</documentation>
    </annotation>
  </element>
  <complexType name="ContentReferencingTableType">
    <sequence>
      <element name="Result" type="CR:ResultType" minOccurs="0" maxOccurs="unbounded"/>
    </sequence>
    <attribute name="version" type="float" use="required"/>
  </complexType>
  <simpleType name="AcquisitionDirectiveType">
    <restriction base="string">
      <enumeration value="all"/>
      <enumeration value="any"/>
    </restriction>
  </simpleType>
  <simpleType name="ResolutionStatusType">
    <restriction base="string">
      <enumeration value="resolved"/>
      <enumeration value="discard CRID"/>
      <enumeration value="cannot yet resolve"/>
      <enumeration value="unable to resolve"/>
    </restriction>
  </simpleType>
  <complexType name="ResultType">
    <choice>
      <sequence>
        <element name="CRIDResult" type="CR:CRIDResultType" minOccurs="0" maxOccurs="unbounded"/>
      </sequence>
      <sequence>
        <element name="LocationsResult" type="CR:LocationsResultType" minOccurs="0" maxOccurs="unbounded"/>
      </sequence>
    </choice>
    <attribute name="CRID" type="metadata:CRIDType" use="required"/>
    <attribute name="complete" type="boolean" use="required"/>
    <attribute name="acquire" type="CR:AcquisitionDirectiveType" use="required"/>
    <attribute name="status" type="CR:ResolutionStatusType" use="required"/>
    <attribute name="reresolveDate" type="dateTime" use="optional"/>
  </complexType>
  <complexType name="CRIDResultType">
    <sequence>
      <element name="Crid" type="metadata:CRIDType" maxOccurs="unbounded"/>
    </sequence>
  </complexType>
```

FIG. 4

```
<complexType name="LocatorType">
  <simpleContent>
    <extension base="anyURI">
      <attribute name="instanceMetadataId" type="metadata:InstanceMetadataIdType" use="optional"/>
    </extension>
  </simpleContent>
</complexType>
<simpleType name="DeliveryModeType">
  <restriction base="string">
    <enumeration value="scheduled"/>
    <enumeration value="ondemand"/>
  </restriction>
</simpleType>
<complexType name="TimeAndURLType">
  <simpleContent>
    <extension base="anyURI">
      <attribute name="mode" type="cr:DeliveryModeType" use="optional" default="scheduled"/>
      <attribute name="start" type="dateTime" use="required"/>
      <attribute name="duration" type="duration" use="optional"/>
      <attribute name="end" type="dateTime" use="optional"/>
      <attribute name="instanceMetadataId" type="metadata:InstanceMetadataIdType" use="optional"/>
    </extension>
  </simpleContent>
</complexType>
<complexType name="LocationsResultType">
  <sequence maxOccurs="unbounded">
    <choice>
      <element name="Locator" type="CR:LocatorType"/>
      <element name="DecomposedLocator" type="CR:TimeAndURLType"/>
    </choice>
  </sequence>
</complexType>
</schema>
```

FIG. 5

```
<?xml version='1.0' encoding='ISO-8859-9'?>
<ContentReferencingTable xmlns='urn:tva:ContentReferencing:2005'
 xmlns:xsi='http://www.w3.org/2001/XMLSchema-instance' version='1'>
  <Result CRID='crid://bbc.co.uk/1195421736' status='resolved' complete='true' acquire='any'>
    <LocationsResult>
      <Locator>dvb://233a.4000.4740;b028@2007-04-24T00:00:00Z/PT04H00M</Locator>
    </LocationsResult>
  </Result>
  <Result CRID='crid://bbc.co.uk/1195421735' status='resolved' complete='true' acquire='any'>
    <LocationsResult>
      <Locator>dvb://233a.4000.4740;b027@2007-04-24T04:00:00Z/PT01H00M</Locator>
    </LocationsResult>
  </Result>
</ContentReferencingTable>
```

METHOD OF PROCESSING DATA IN INTERNET PROTOCOL TELEVISION RECEIVER AND INTERNET PROTOCOL TELEVISION RECEIVER

This application claims the benefit of U.S. Provisional Application No. 61/038,423, filed on Mar. 21, 2008, which is hereby incorporated by reference as if fully set forth herein. Also, this application claims the benefit of U.S. Provisional Application No. 61/042,255, filed on Apr. 3, 2008, which is hereby incorporated by reference as if fully set forth herein. This application also claims the benefit of Korean Application No. 10-2009-0003308, filed on Jan. 15, 2009, which is hereby incorporated by reference.

BACKGROUND OF THE INVENTION

1. Field of the Invention

The present invention relates to an Internet protocol television (IPTV) system, and more particularly, to a method of processing data in an IPTV receiver and such an IPTV receiver.

2. Discussion of the Related Art

An existing TV system may be implemented, for example, in the following manner. A cable broadcast provider, terrestrial broadcast provider or satellite broadcast provider transmits contents produced by broadcasters via a transmission medium such as a broadcasting network. Therefore, the user of the TV system can watch the transmitted contents through a TV receiver capable of receiving the transmitted contents via the transmission medium.

However, as digital TV technologies based on digital broadcasting are developed and are commercially available, breaking from existing analog broadcasting, various contents including real-time broadcasts, Contents on Demand (CoD), games and news can be provided to the user using an Internet network connected to each home, besides existing transmission media.

Such an IPTV receiver providing various contents using an Internet network has various advantages. For example, differently from general terrestrial broadcasting, cable broadcasting or satellite broadcasting, the user can watch a desired content at a desired time.

On the other hand, recently, there has been a discussion on improvements in network-related problems, etc. in an IPTV broadcasting environment. However, a concrete protocol capable of solving such problems has not been defined.

SUMMARY OF THE INVENTION

Accordingly, the present invention is directed to a method of processing data in an IPTV receiver and such an IPTV receiver that substantially obviate one or more problems due to limitations and disadvantages of the related art.

An object of the present invention is to provide a method of processing data in an IPTV receiver and such an IPTV receiver that can improve network-related problems in an IPTV broadcasting environment.

Another object of the present invention is to definitely define a data protocol capable of rapidly processing various contents (for example, CoD) in an IPTV broadcasting environment in which an IP multimedia subsystem (IMS) is introduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in an Internet protocol television (IPTV) receiver includes: receiving location information necessary to acquire a content corresponding to a content reference identifier (CRID) by using the CRID; requesting an Internet protocol multimedia subsystem Gateway (IG) to transmit a session description protocol (SDP) file of the content, wherein the content is identified by the CRID and an instance metadata identifier (IMI); receiving the requested SDP file from the IG; and controlling a session setup for processing the content by using the received location information and the received SDP file.

In another aspect of the present invention, a method of processing data in an Internet protocol television (IPTV) receiver includes: receiving location information necessary to acquire a content corresponding to a content reference identifier (CRID) by using the CRID; requesting an Internet protocol multimedia subsystem Gateway (IG) to transmit a session description protocol (SDP) file of the content, wherein the content is identified by the CRID and an instance metadata identifier (IMI); requesting a content server to transmit the SDP file if the requesting is completed; transmitting the received SDP file to an open IPTV terminal function (OITF), wherein the received SDP file is received from the content server; and controlling a session setup for processing the content by using the received location information and the received SDP file.

In a further aspect of the present invention, an Internet protocol television (IPTV) receiver includes: a first receiving unit receiving location information necessary to acquire a content corresponding to a content reference identifier (CRID) by using the CRID; a requesting unit requesting an Internet protocol multimedia subsystem Gateway (IG) to transmit a session description protocol (SDP) file of the content, wherein the content is identified by the CRID and an instance metadata identifier (IMI); a second receiving unit receiving the requested SDP file from the IG; and a controlling unit controlling a session setup for processing the content by using the received location information and the received SDP file.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3 and 4 are views showing a location resolution schema structure in an IPTV broadcasting environment according to one embodiment of the present invention;

FIG. 5 is a view showing a content referencing table in an IPTV broadcasting environment according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
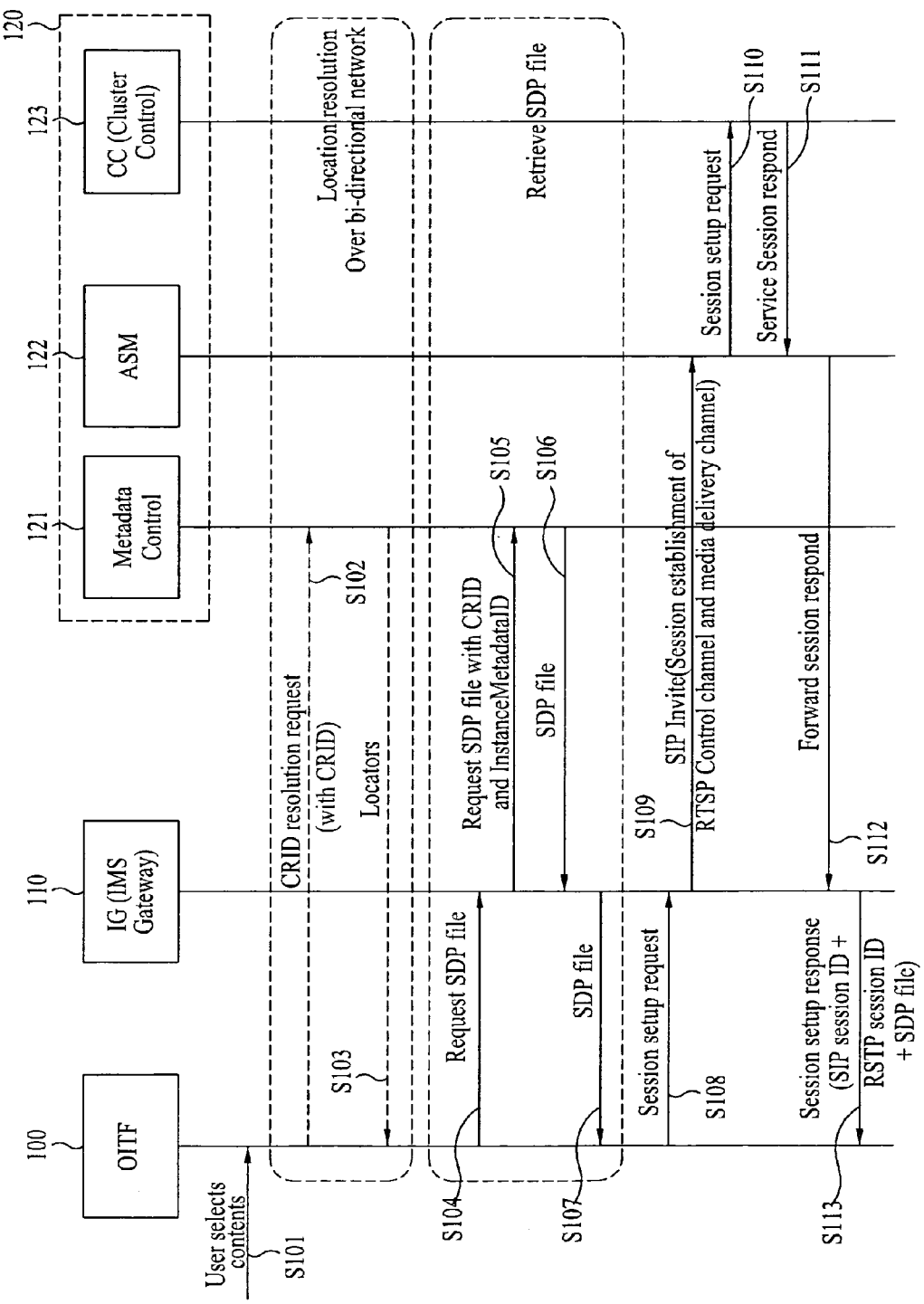
FIG. 1 is a view illustrating a data processing process of a system including an IPTV receiver according to one embodiment of the present invention.

FIG. 1 illustrates a data processing process of a system including an IPTV receiver according to one embodiment of the present invention.

As shown in FIG. 1, the system including the IPTV receiver according to one embodiment of the present invention may be made up of, for example, an open IPTV terminal function (OITF) 100, an Internet protocol multimedia subsystem Gateway (IG) 110, and a service server 120. Particularly, with reference to FIG. 1, a description will be given of a concrete method of processing various contents when the IG 110 is additionally provided on a network differently from an existing IPTV broadcasting environment.

The service server 120 may include, for example, a metadata control 121, an Authentication and Session Management (ASM) 122, and a cluster control (CC) 123. The IPTV receiver according to one embodiment of the present invention may include only the OITF 100 or both the OITF 100 and IG 110.

In an IPTV broadcasting environment according to one embodiment of the present invention, when the OITF 100 receives a signal for selection of a specific content (for example, CoD) (S101), it transmits a content reference identifier (CRID) resolution request signal corresponding to the specific content to the metadata control 121 by using a CRID (S102). Then, the metadata control 121 transmits location information necessary to acquire the specific content to the OITF 100 (S103). Here, the CRID resolution may mean, for example, a process of acquiring location information from a given CRID or acquiring a different CRID.

Also, the OITF 100 requests the IG 110 to transmit a session description protocol (SDP) file corresponding to the specific content, which is identified by the CRID and an instance metadata identifier (IMI) (S104). When the requesting is completed (S104), the IG 110 requests the metadata control 121 to transmit the SDP file (S105). Also, the metadata control 121 transmits the SDP file requested at step S105 to the IG 110 (S106), and the IG 110 transmits the transmitted SDP file to the OITF 100 (S107).

As a result, because the OITF 100 has received both the location information and SDP file of the specific content, it can control a session setup process based on the received location information and the received SDP file.

The OITF 100 transmits a request signal for a session setup for processing of the content to the IG 110 (S108). The IG 110 transmits a session initiation protocol (SIP) invite signal to the ASM 122 (S109), and the ASM 122 transmits the session setup request signal to the CC 123 (S110). Also, the CC 123 transmits a service session respond signal to the ASM 122 (S111), and the ASM 122 forwards the service session respond signal to the IG 110 (S112). Then, the IG 110 transmits a session setup response signal to the OITF 100 (S113).

On the other hand, although the metadata control 121, ASM 122 and CC 123 have been illustrated in FIG. 1 and the associated description, they may be replaced by other modules or servers included in a content server.

The location information can be designed to include a session initiation protocol-uniform resource identifier (SIP-URI), and the SDP file can be designed to include a streaming multimedia initiation parameter constituting the content. For detailed example, the SDP file may include media flow information (for example, a media detail, a transport address, session description metadata, etc.) constituting the content.

Therefore, the use of one embodiment of the present invention designed as in FIG. 1 makes it possible to secure both an SIP-URI and SDP file prior to a session setup process in an IG-added IPTV broadcasting environment, thereby processing all various contents.

Figure 2:
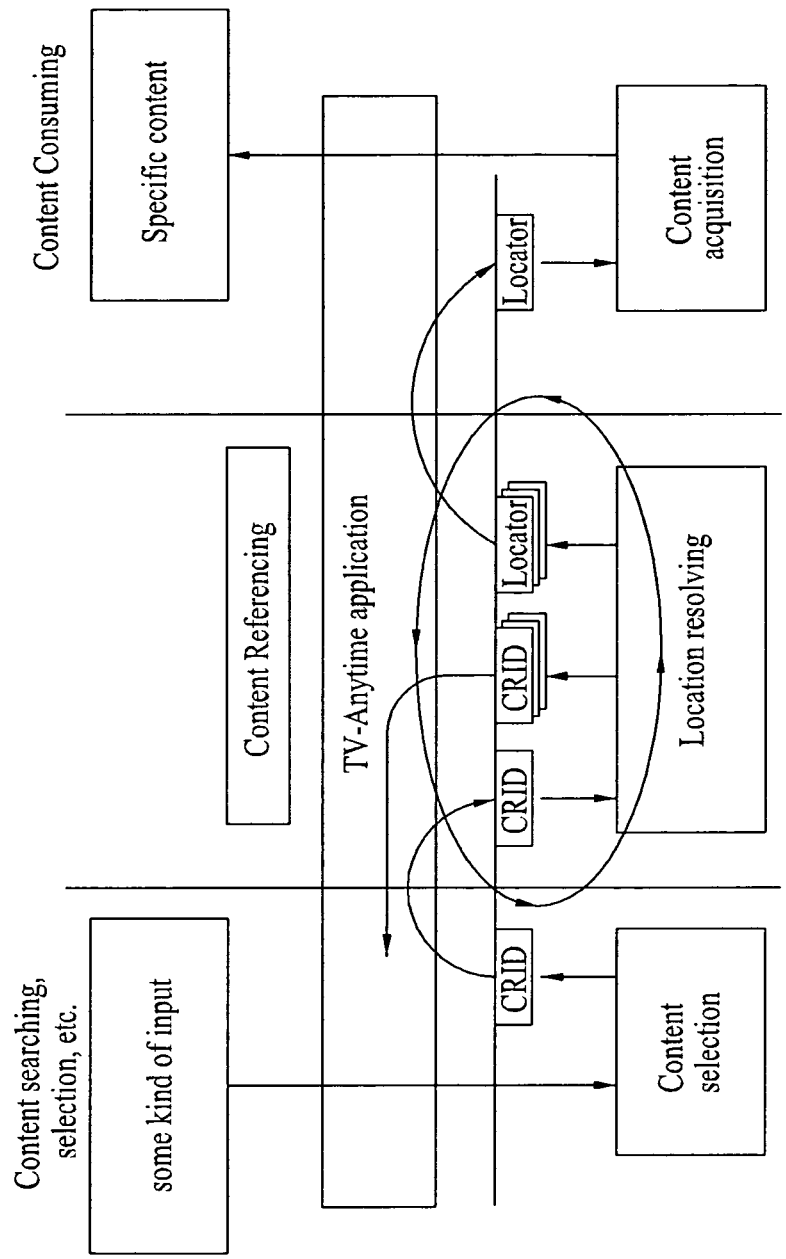
FIG. 2 is a view illustrating an overall content referencing process in an IPTV broadcasting environment according to one embodiment of the present invention.

Also, according to another embodiment of the present invention, it is possible to identify each content using a content reference identifier (CRID). Further, for display of a content selected by the user, location information necessary to acquire a content corresponding to the CRID is acquired through a CRID location resolution process. For example, as shown in FIG. 2 (a view illustrating an overall content referencing process in an IPTV broadcasting environment according to one embodiment of the present invention), a content selected by the user is identified by a CRID, location information including the location of an instance of the content is extracted through a location resolving process for the CRID, and the content can thus be consumed.

For reference, the content may be, for example, a movie "Spiderman", and the instance may be, for example, "Spiderman-HD level picture quality", "Spiderman-SD level picture quality" or "Spiderman-mobile picture quality".

FIGS. 3 and 4 show a location resolution schema structure in an IPTV broadcasting environment according to one embodiment of the present invention. For reference, FIGS. 3 and 4 correspond to one schema structure, which is shown separately in two figures due to restriction in the size of the drawing.

As shown in FIGS. 3 and 4, details of location information corresponding to a CRID detected through a CRID resolution process are defined in Location Result Type, and the location information can be transmitted in a content referencing table.

FIG. 5 shows a content referencing table in an IPTV broadcasting environment according to one embodiment of the present invention.

As shown in FIG. 5, a first result record includes location information (locator) of "dvb://233a.4000.4740; b028@2007-04-24T00:00:00Z/PT04H00M", which is a resolution result of a CRID corresponding to "crid://bbc-.co.uk/1195421736".

That is, as shown in FIGS. 1 to 5, in one embodiment of the present invention, an SIP-URI is transmitted in location information (this may be referred to as a "locator"), and a protocol for transmission of an SDP prior to a session setup is more definitely defined.

On the other hand, steps S102 and S103 shown in FIG. 1 may be collectively named a CRID resolution process, which is a process of searching for location information, or locator. According to another embodiment of the present invention, this CRID resolution process can be implemented in two ways.

Firstly, the CRID resolution process can be implemented using a step of receiving a content referencing table through broadband content guide (BCG) information, and a step of detecting the same location information as that of the CRID from among location information defined in the table.

The aforementioned first method is useful when the BCG information is received in a multicast mode. In this method, a CRID resolution result is transmitted in the BCG information. Also, because this method corresponds to the case where an IPTV receiver has already received and held program information and instance description metadata, the IPTV receiver can complete the CRID resolution process by using a process of searching the content referencing table for a result having the same CRID value.

On the other hand, for reference, the BCG information includes detailed information, connection locations, service provider information, service channels, etc. about various contents in an IPTV broadcasting environment. Further, the BCG information may include stream connection information based on a real-time streaming protocol/real-time transport protocol (RTSP/RTP), so that the IPTV receiver may make a direct connection to a streaming server.

Accordingly, the use of the above-stated first method is advantageous in that location information, an SDP file, etc. may be transmitted in an extended BCG.

Secondly, the CRID resolution process can be implemented using a step of transmitting a CRID to a location resolution server, and a step of receiving a content referencing table including the same location information as that of the CRID from the server.

The aforementioned second method is useful when a CRID resolution is carried out over a duplex channel. In this method, the CRID is transmitted to the location resolution server, and the content referencing table, which is a resolution result, is received from the server. The use of this method is advantageous in that a relatively small amount of BCG information is transmitted to an IPTV receiver because only program information is contained in the BCG information transmitted to the IPTV receiver. Accordingly, the content provision can be performed more rapidly.

Meanwhile, in the present invention, as seen from steps S104, S105, S106 and S107 of FIG. 1, a definition is given of a method of acquiring an SDP file through a separate transaction in an IG-added IPTV broadcasting environment.

If the CRID location resolution process is completed through steps S102 and S103 of FIG. 1, the OITF 100 requests a content server (for example, a location resolution server, metadata control or the like) to transmit an SDP file necessary to process an instance of the specific content, and then receives the SDP file from the content server. This has an advantage that there is no need to change BCG information even when there is a change in the contents of the SDP file.

On the other hand, in order to request the SDP file, there is a need for a CRID corresponding to the content, and an IMI corresponding to a specific instance belonging to the content. One unique content instance can be identified by a combination of the CRID and IMI. Of course, in some cases, provided that one CRID has only one instance, the content can be identified by only the CRID.

Also, the SDP file receiving process (for example, steps S104, S105, S106 and S107 of FIG. 1) may be performed before the OITF requests the session setup to the IG. Alternatively, after the OITF requests the session setup to the IG, the IG may request the SDP file, receive the SDP file to complete the session setup, and then transmit the SDP file to the OITF together with a session setup result.

Figure 6:
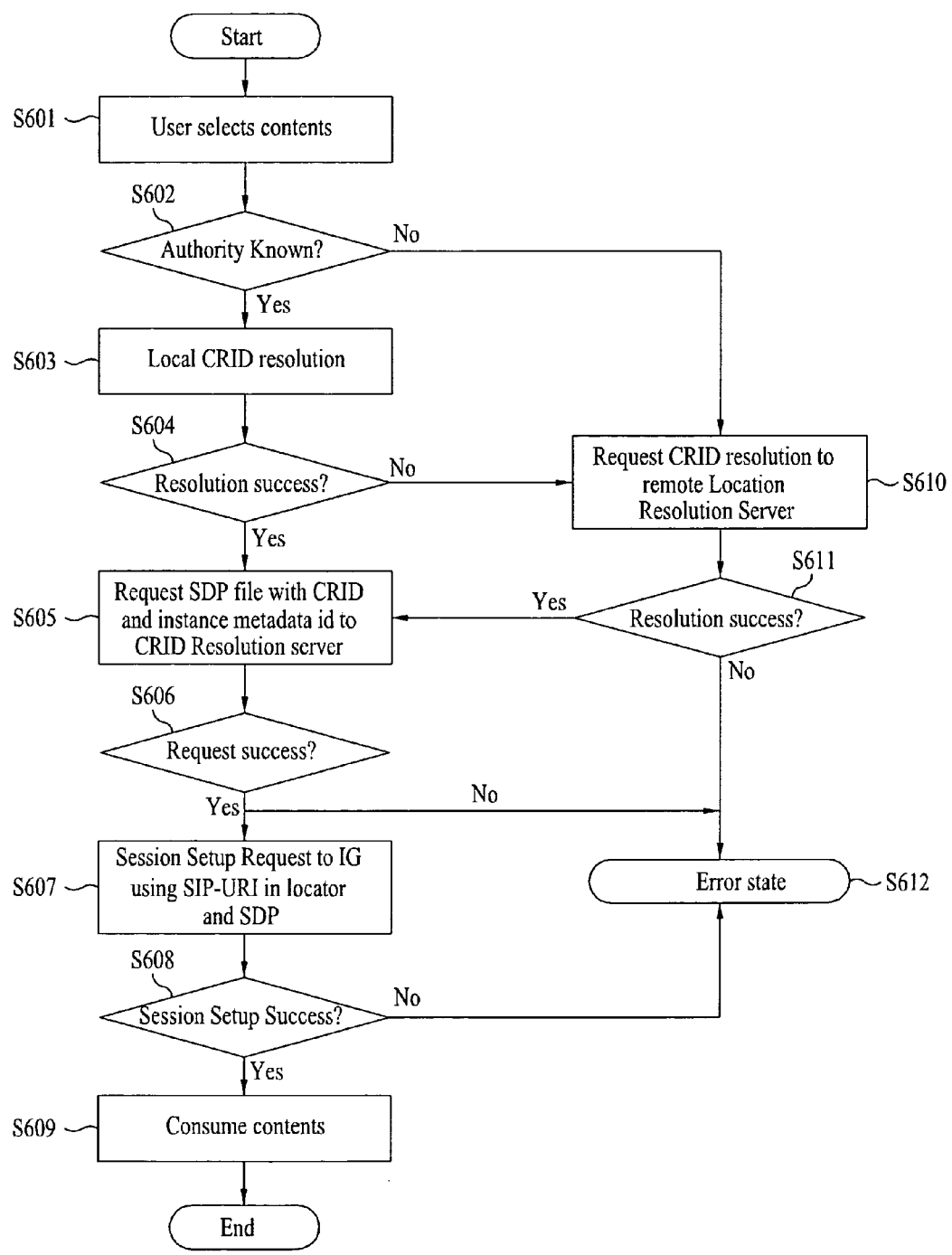
FIG. 6 is a flowchart illustrating a data processing process of an IPTV receiver according to one embodiment of the present invention.

FIG. 6 is a flowchart illustrating a data processing process of an IPTV receiver according to one embodiment of the present invention. With reference to FIG. 6, a detailed description will hereinafter be given of the operation of the IPTV receiver of rapidly processing various contents in an IG-added IPTV broadcasting environment by transmitting an SDP file using a separate transaction as stated above.

The user of the IPTV receiver selects a desired content (S601). That is, a control signal at step S601 is transmitted to the IPTV receiver. Also, the IPTV receiver determines whether it already has information about authority of a CRID corresponding to the selected content (S602). That is, this step S602 is a process of determining whether the IPTV receiver can perform a CRID resolution in a local area without communication with a server, etc.

In the case where it is determined at step S602 that the IPTV receiver has the authority information, the IPTV receiver performs the CRID resolution in the local area (S603) and then determines whether the CRID resolution has succeeded (S604).

In the case where it is determined at step S602 that the IPTV receiver does not have the authority information or in the case where it is determined at step S604 that the CRID resolution has not succeeded, the IPTV receiver requests the CRID resolution to a remote location resolution server (S610). Subsequently to step S610, the IPTV receiver determines whether the CRID resolution has succeeded (S611).

If it is determined at step S604 or S611 that the CRID resolution has succeeded, the IPTV receiver requests the CRID resolution server to transmit an SDP file by using the CRID and IMI corresponding to the content (S605). Here, the CRID resolution server may be replaced by a different server in a content server.

Also, the IPTV receiver determines whether the requesting at step S605 has succeeded (S606). In the case where it is determined at step S606 that the requesting has succeeded, the IPTV receiver can receive the SDP file. As an alternative, consideration may be given to a method in which the IPTV receiver receives only an SDP uniform resource locator (URL) and then accesses the SDP URL to receive the SDP file.

On the other hand, in the case where it is determined at step S606 that the requesting has not succeeded or in the case where it is determined at step S611 that the CRID resolution has not succeeded, the IPTV receiver can display an error state (S612). Conversely, in the case where it is determined at step S606 that the requesting has succeeded, the IPTV receiver requests a session setup to an IG using an SIP-URI in location information and the SDP file (S607). Then, the IPTV receiver determines whether the session setup has succeeded (S608).

In the case where it is determined at step S608 that the session setup has succeeded, the IPTV receiver consumes the content (S609). Conversely, if it is determined at step S608 that the session setup has not succeeded, the IPTV receiver proceeds to step S612.

Figure 7:
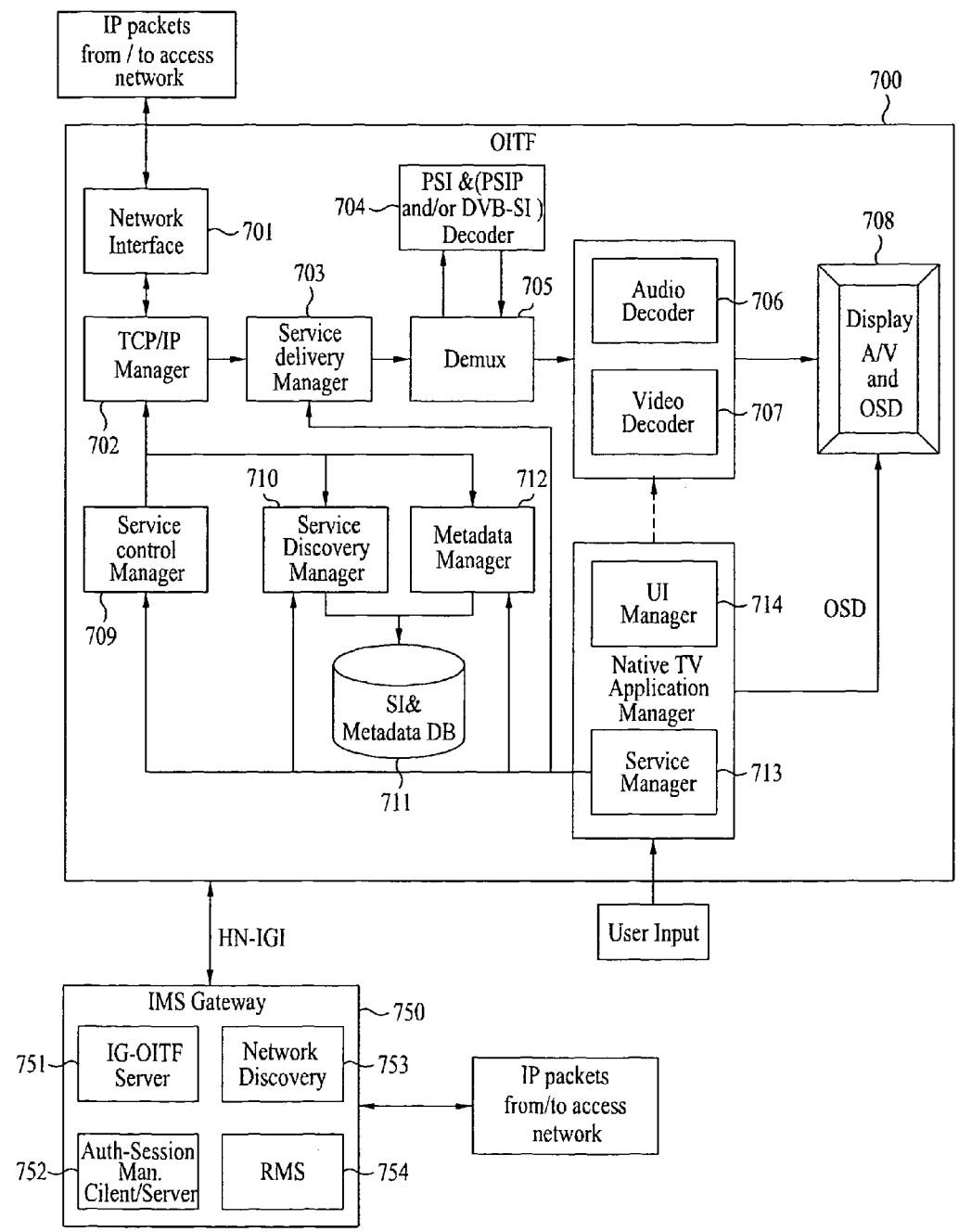
FIG. 7 is a block diagram showing constituent elements of an IPTV receiver according to one embodiment of the present invention.

FIG. 7 is a block diagram showing constituent elements of an IPTV receiver according to one embodiment of the present invention. Hereinafter, with reference to FIG. 7, a description will be given of one embodiment of the present invention that processes contents in an IPTV broadcasting environment in which an IG (IMS Gateway or Internet protocol multimedia subsystem Gateway) is additionally provided.

The IPTV receiver according to one embodiment of the present invention may be designed to include an OITF 700, but not include an IG 750, or designed to include both the OITF 700 and IG 750. Also, the configuration of FIG. 7 is nothing but one embodiment, and the scope of the present invention should be in principle determined by the appended claims, not by FIG. 7.

The OITF 700 includes a network interface 701, TCP/IP manager 702, service delivery manager 703, demultiplexer (Demux) 705, PSI&(PSIP and/or DVB-SI) decoder 704, audio decoder 706, video decoder 707, display A/V and OSD module 708, service control manager 709, service discovery manager 710, metadata manager 712, SI&metadata DB 711, UI manager 714, and service manager 713.

The network interface 701 receives packets from a network and transmits packets to the network. That is, the network interface 701 receives a service, content, etc. from a service provider over the network.

The TCP/IP manager 702 engages in packet delivery from sources to destinations with respect to a packet which is received by the OITF 700 and a packet which is transmitted by the OITF 700. Also, the TCP/IP manager 702 classifies received packets such that the received packets correspond to appropriate protocols, and outputs the classified packets to the service delivery manager 703, service discovery manager 710, service control manager 709, and metadata manager 712.

The service delivery manager 703 takes charge of control of service data received. For example, the service delivery manager 703 may use an RTP/RTCP for control of real-time streaming data. When the real-time streaming data is transmitted using the RTP, the service delivery manager 703 parses the received data packet according to the RTP and delivers the parsed packet to the demultiplexer 705 or stores the parsed packet in the SI&metadata DB 711 under control of the service manager 713. Also, the service delivery manager 703 feeds information received from the network back to a service providing server using the RTCP.

The demultiplexer 705 demultiplexes a received packet into audio data, video data, program specific information (PSI) data, etc. and transmits the audio data, video data, PSI data, etc. to the audio and video decoders 706 and 707 and the PSI&(PSIP and/or DVB-SI) decoder 704, respectively.

The PSI&(PSIP and/or DVB-SI) decoder 704 decodes service information such as program specific information (PSI). That is, the PSI&(PSIP and/or DVB-SI) decoder 704 receives and decodes a PSI section, a Program and Service Information Protocol (PSIP) section, a DVB-service information (SI) section, etc. demultiplexed by the demultiplexer 705.

Also, the PSI&(PSIP and/or DVB-SI) decoder 704 decodes the received sections to create a database about the service information, and stores the database about the service information in the SI&metadata DB 711.

The audio and video decoders 706 and 707 decode audio data and video data received from the demultiplexer 705, respectively. The audio data decoded by the audio decoder 706 and the video data decoded by the video decoder 707 are provided, to the user through the display A/V and OSD module 708.

The UI manager 714 and the service manager 713 manage the entire state of the OITF 700, provide a user interface and manage other managers.

The UI manager 714 provides a graphic user interface (GUI) for the user using an on-screen display (OSD), etc., and receives a key input from the user and performs an operation of the receiver based on the key input. For example, if the UI manager 714 receives a key input for channel selection from the user, then it transmits the received key input to the service manager 713.

The service manager 713 controls service-associated managers such as the service delivery manager 703, service discovery manager 710, service control manager 709, and metadata manager 712.

Also, the service manager 713 creates a channel map, and selects a channel by using the channel map based on the key input received from the user interface (UI) manager 714. The service manager 713 receives service information of the selected channel from the PSI&(PSIP and/or DVB-SI) decoder 704 and sets an audio/video packet identifier (PID) of the selected channel in the demultiplexer 705 based on the received service information.

The service discovery manager 710 provides information required for selection of a service provider. If the service discovery manager 710 receives a signal for channel selection from the service manager 713, then it searches for a corresponding service using the information.

The service control manager 709 takes charge of selection and control of a service. For example, the service control manager 709 performs the service selection and control by using an IGMP or RTSP when the user selects a live broadcasting service as in an existing broadcasting system, and by using the RTSP when the user selects a service such as Video On Demand (VOD). The RTSP can provide a trick mode for real-time streaming. Also, the service control manager 709 can initiate and manage a session through an IMS gateway by using an IP multimedia subsystem (IMS) and a session initiation protocol (SIP). These protocols are nothing but one embodiment and different protocols may be used according to different embodiments.

The metadata manager 712 manages service-associated metadata and stores the metadata in the SI&metadata DB 711.

The SI&metadata DB 711 stores the service information decoded by the PSI&(PSIP and/or DVB-SI) decoder 704, the metadata managed by the metadata manager 712, and the information required for service provider selection provided by the service discovery manager 710. Also, the SI&metadata DB 711 may store setup data of a system, etc.

This SI&metadata DB 711 may be implemented by a Non-Volatile RAM (NVRAM) or flash memory.

On the other hand, the IG 750 is a gateway that collects functions necessary to access an IMS-based IPTV service based on an IMS core network. This IG 750 includes an IG-OITF server 751, network discovery 753, authentication/session management client/server 752, and RMS 754.

The OITF 700 can use the IMS-based IPTV service by interfacing with the IG 750. The IG 750 and the OITF 700 are interconnected via, for example, an HN-IGI interface, which can process a function provided by the IG 750 such that the OITF 700 can use the IMS-based IPTV service.

The IG-OITF server 751 provides a function of the authentication/session management client/server 752 to the OITF 700. The IG-OITF server 751 can provide the function of the authentication/session management client/server 752 to the OITF 700 through a protocol such as a hypertext transfer protocol (HTTP).

The network discovery 753 searches for an IMS server and performs an access to the IMS server.

The authentication/session management client/server 752 performs subscriber authentication, and session management required on a managed network.

The RMS 754 performs a remote management function in a managed environment.

Hereinafter, the operation of an IPTV receiver according to one embodiment of the present invention will be described with reference to FIGS. 1, 6 and 7. Here, the IPTV receiver may be designed to include an OITF, but not include an IG, or designed to include both the OITF and IG.

A first receiving unit of the OITF 700 receives location information necessary to acquire a content corresponding to a CRID by using the CRID. Here, the network interface 701 and the TCP/IP manager 702 may be designed to take charge of the function of the first receiving unit.

A requesting unit of the OITF 700 requests the IG 750 to transmit an SDP file of the content, which is identified by the CRID and an IMI. Here, the service control manager 709 may be designed to take charge of the function of the requesting unit.

A second receiving unit of the OITF 700 receives the requested SDP file from the IG 750. Here, the network interface 701 and the TCP/IP manager 702 may be designed to take charge of the function of the second receiving unit. Also, the first and second receiving units may be implemented into a single receiving unit.

A controlling unit of the OITF 700 controls a session setup for processing the content by using the received location information and the received SDP file. Here, the service discovery manager 710 and the metadata manager 712 may be designed to take charge of the function of the controlling unit.

For example, according to one embodiment of the present invention, the location information is designed to include an SIP-URI, and the SDP file is designed to include a streaming multimedia initiation parameter constituting the content.

As stated above in conjunction with FIGS. 1 to 7, according to one embodiment of the present invention, an SIP-URI and an SDP file are provided in an extended BCG in an IMS-based IPTV broadcasting environment, thereby making it possible to implement a session setup operation, which is a precondition for reception of various contents.

Alternatively, according to another embodiment of the present invention, an SDP file may be signaled through a separate URL, not included in a BCG. Therefore, it is possible to reduce the data size of BCG information and solve a problem that the BCG information must be updated whenever the SDP file is updated.

Therefore, provided that the present invention is applied to an IPTV broadcasting system, it is possible to improve network-related problems in an IPTV broadcasting environment.

Further, provided that the present invention is applied to an IPTV broadcasting system, it is possible to definitely define a data protocol capable of rapidly processing various contents (for example, CoD) in an IPTV broadcasting environment in which an IMS is introduced.

In addition, provided that the present invention is applied to an IPTV broadcasting system, it is possible to provide an SDP file in an extended BCG while maintaining backward compatibility with an existing IPTV system.

The method described herein may be presented in the form of a program command, which may be executed through a diversity of computer devices, so as to be recorded (or written) in a computer readable medium. Herein, the computer readable medium may include a program command, a data file, and a data structure individually or in combination. The program command recorded in the medium may correspond either to a device (or medium) specially designed for the embodiment of the present invention or to a usable device (or medium) disclosed to a computer software manufacturer. Examples of computer readable media may include a hard disk, magnetic media (e.g., floppy disks and magnetic tapes), a CD-ROM, optical media such as DVD, magneto-optical media such as floptical disks, and a hardware device specially configured to store and perform program commands, such as ROM, RAM, and flash memories. Examples of the program command may include a machine language code created by a compiler, as well as a high-level language code that can be executed by the computer using an interpreter. The above-described hardware device may be configured to be operated using at least one software module in order to perform an operation, and vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of retrieving at least one parameter of a SDP (session description protocol) file prior to a session setup in an open IPTV terminal function (OITF) receiver, the method comprising:

performing a content reference identifier (CRID) location resolution process of mapping a CRID to either other CRIDs or a location information, wherein the location information provides additional data to retrieve the content;

retrieving the at least one SDP parameter prior to the session setup, the retrieving comprises, firstly requesting by the OITF receiver to an Internet protocol multimedia subsystem Gateway (IG) on a home network interface-IG interface (HNI-IGI) interface, the at least one SDP parameter;

secondly requesting by the IG to a network, the at least one SDP parameter, wherein the content is identified by at least one of CRID and Instance Metadata Identifier (IMI);

retrieving, by the IG, the at least one SDP parameter from the network;

forwarding the at least one SDP parameter from the IG to the OITF receiver; and performing the process of the session setup after the OTIF receiver has retrieved the at least one the SDP parameter, wherein the CRID location resolution process further comprises:

transmitting the CRID to a location resolution server; and receiving other CRIDs or location information based on a content referencing table from the location resolution server.

2. The method according to claim 1, wherein the location information includes a session initiation protocol-uniform resource identifier (SIP-URI).

3. The method according to claim 1, wherein the IG requests a content server to transmit the SDP, and receives the requested SDP from the content server.

4. The method according to claim 1, wherein performing the process of the session setup comprises:

transmitting a request signal for the session setup for processing the content to the IG; and receiving a session setup response signal from the IG.

5. A computer-readable recording medium for recording a program for execution of the method of claim 1.

6. An open IPTV terminal function (OITF) receiver that retrieves at least one parameter of a SDP (session description protocol) file prior to a session setup, the OITF receiver comprising:
- a first performing unit configured to perform a content reference identifier (CRID) location resolution process of mapping a CRID to either other CRIDs or a location information, wherein the location information provides additional data to retrieve the content;
- a retrieving unit configured to retrieve the at least one SDP parameter prior to the session setup, the retrieving comprises:
  - firstly requesting by the OITF receiver to an Internet protocol multimedia subsystem Gateway (IG) on a home network interface-IG interface (HNI-IGI) interface, the at least one SDP parameter;
  - secondly requesting by the IG to a network, the at least one SDP parameter, wherein the content is identified by at least one of CRID and Instance Metadata Identifier (IMI);
  - retrieving, by the IG, the at least one SDP parameter from the network;
- forwarding the at least one SDP parameter from the IG to the OITF receiver; and
- a second performing unit configured to perform a process of the session setup after retrieving the at least one SDP parameter,
- wherein the CRID location resolution process further comprises:
- transmitting the CRID to a location resolution server; and
- receiving other CRIDs or location information based on a content referencing table from the location resolution server.

7. The OITF according to claim 6, wherein the location information includes a session initiation protocol-uniform resource identifier (SIP-URI).

* * * * *